(12) United States Patent
Miller et al.

(10) Patent No.: US 6,654,033 B1
(45) Date of Patent: *Nov. 25, 2003

(54) FINITE STATE AUTOMATION FOR EMULATION OF ACTIVITY SEQUENCED ENGINE

(75) Inventors: Mark Lee Miller, Pflugerville, TX (US); Michael Scott Priddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,707

(22) Filed: Dec. 7, 1999

(51) Int. Cl.[7] .................................................. G09G 5/00
(52) U.S. Cl. ...................................... 345/763; 345/747
(58) Field of Search ................................. 345/763, 762, 345/771, 747, 746, 772, 734, 735–739, 740–741, 712, 713; 707/10, 11; 709/240, 241, 201; 703/17, 22

(56) References Cited

U.S. PATENT DOCUMENTS

| | | | |
|---|---|---|---|
| 5,325,534 A | * 6/1994 | Galy | ........................... 345/763 |
| 5,561,800 A | 10/1996 | Sabatella | |
| 5,566,292 A | * 10/1996 | Krembs | ....................... 345/767 |
| 5,652,714 A | 7/1997 | Peterson et al. | |
| 5,671,415 A | 9/1997 | Hossain | |
| 5,778,059 A | 7/1998 | Loghmani et al. | |
| 5,786,816 A | * 7/1998 | Macrae et al. | ............... 345/763 |
| 5,805,896 A | 9/1998 | Burgess | |
| 5,815,153 A | 9/1998 | Isensee et al. | |
| 5,815,715 A | 9/1998 | Ku. uk akar | |
| 5,835,914 A | 11/1998 | Brim | |
| 5,864,819 A | 1/1999 | De Armas et al. | |
| 5,870,590 A | 2/1999 | Kita et al. | |
| 5,883,639 A | 3/1999 | Walton et al. | |
| 5,915,115 A | 6/1999 | Talati | |
| 6,056,428 A | * 5/2000 | Devoino et al. | ............. 364/512 |
| 6,173,246 B1 | * 1/2001 | Billups, III | ................... 703/22 |
| 6,202,043 B1 | * 3/2001 | Devoino et al. | ............... 703/17 |
| 6,484,261 B1 | * 11/2002 | Wiegel | ........................ 713/201 |
| 6,489,971 B1 | * 12/2002 | Miller et al. | ................. 345/763 |

* cited by examiner

*Primary Examiner*—Steven Sax
(74) *Attorney, Agent, or Firm*—Winstead Sechrest & Minick P.C.; Leslie A. Van Leeuwen

(57) ABSTRACT

Disclosed is an apparatus and method to build activity sequenced engine programs from activity function units (AFUs) within a graphical environment. Each AFU is comprised of a set of graphical representations of functional units (FUs). AFUs can be combined with other FUs and previously-created code represented in FU form to build large complex programs which present the same functionality as iterative systems but are easily modified and added to by the user.

30 Claims, 8 Drawing Sheets

```
void a()
{
      do
      {
      if 2 then b;
      if 3 then return(0);
      }
      while(!2 && !3);
}
```
⎫
⎬ 210
⎭

```
void b()
{
      do
      {
      if 5 then c;
      if 6 then return(0);
      }
      while(!5 && !6);
}
```
⎫
⎬ 212
⎭

```
void c()
{
      do
      while(!4);
      return(0);
}
```
⎫
⎬ 214
⎭

```
void main()
{
      a;
}
```

Fig. 2

FINITE STATE AUTOMATION FOR EMULATION OF ACTIVITY SEQUENCED ENGINE

CROSS-REFERENCE TO RELATED APPLICATIONS

This application relates to U.S. Pat. No. 6,489,971 entitled "Graphical Programming Environment for Deterministic Finite State Automata," filed contemporaneously herewith. This application also relates to U.S. patent application, Ser. No. 09/455,708, entitled "Finite State Automata Security System," filed contemporaneously herewith.

TECHNICAL FIELD

The present invention relates in general to programmed data processing systems, and in particular to programmable deterministic finite state automata machines and graphical user interface (GUI) systems.

BACKGROUND INFORMATION

A finite state automation, also called a "finite state machine" or "transducer," consists of a set of states, a set of input events, a set of output events, and a state transition function. The set of states includes an internal state. Some states may be designed as "terminal states." The state transition function takes the current state in an input event and returns the new set of output events and the next state. The finite state machine can also be viewed as a function which maps an ordered sequence of input events onto a corresponding sequence of output events.

A deterministic finite state automation is one where each next state is uniquely determined by a single input event. A deterministic finite state automation is contrasted with a backtracking automation, where at each state there may be several possible actions and the only way to choose between them is to try each one and backtrack if that transition fails.

A deterministic finite state automation can be depicted in a variety of manners well-recognized within the mathematical art. One way in which a deterministic finite state automation might be depicted is in a table format. For example:

| Current State | Exit Condition | Next State |
| --- | --- | --- |
| Begin | Start | A |
| A | 2 | B |
| A | 3 | Exit |
| B | 5 | C |
| B | 6 | Exit |
| C | 4 | Exit |

For greater clarity, a deterministic finite state automation may be depicted graphically as in FIG. 1, which illustrates the automation of the table. The first row of the table format is depicted by a Begin state 101. The next state listed on the table is A 103. Movement is made from the Begin state 101 to the A state 103 upon a starting condition 111. Likewise, the diagram illustrates that states B 105 exit conditions for 5 119 and 6 121, and state C 107 has an exit condition 4 117.

Finite state automata have been reduced to programming code, as demonstrated by FIG. 2. While FIG. 2 demonstrates iterative meta-code to implement the finite state automation shown in the table above and FIG. 1, those skilled in the art will appreciate that deterministic finite state automata may be implemented in a variety of programming languages to achieve results similar to the results obtained from the pseudo-code in FIG. 2. Deterministic finite state automation are well-suited to being programmed in object-oriented languages. In fact, object-oriented languages have heretofore been considered ideal for computer implementation of the deterministic finite state automata model.

Those skilled in the art will appreciate, however, that, regardless of the language used, significant skill is required to render a coded implementation of an iterative process. The instant invention addresses this barrier by presenting a system which can use the graphical implications of a finite state automata model to overcome the limitations inherent in implementing a sequenced engine.

SUMMARY OF THE INVENTION

The invention is a graphical-oriented editor that greatly simplifies the creation, testing, and subsequent revision of an activity sequencer engine through the use of a deterministic finite state automata model. The editor is based upon the concept of functional units (FUs). Each FU represents a state in a deterministic finite state automation. Each FU is an object that facilitates the meaningful connection to other AFUs to construct a larger logical entity which is an activity functional unit (AFU). Any AFU may be treated as a FU and nested.

By manipulating the FUs and defining relationships between them graphically on the screen, the instant invention allows a user to build a complete sequenced program from FUs. The resulting program is an AFU can be combined with other AFUs and previously created AFUs to build large, complex programs.

Three control structures are necessary to implement to any iterative program: sequence, branching, and iteration. Therefore, the instant invention provides for each of these features in order to permit construction of the most powerful and fully functional sequenced engine programs.

A database structure is also disclosed for facilitation of the display of the FU in the graphical environment.

The development cycle for products built from FUs through the instant graphical editor is considerably shorter than the development cycle for products constructed in a more traditional coding manner. Consequently, the cost of development is decreased. Short development cycles also enable development groups to more quickly respond to product management and marketing requirements.

The use of FUs and the graphic editor also considerably reduces the complexity of modifications to existing activity sequencer engines. Consequently, the cost of upkeep and maintenance of programs is decreased. Development groups are also able to then respond quickly to modification requirements.

The foregoing outlines broadly the features and technical advantages of the present invention in order that the detailed description of the invention that follows may be better understood. Additional features and advantages of the invention will be is described hereinafter, which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is an example of the finite state automation depicted in FIG. 1 as implemented in C-type meta-code;

DETAILED DESCRIPTION OF THE INVENTION

In the following description, numerous specific details are set forth such as computer programming languages, computer operating systems, graphic display systems, input/output systems, etc., to provide a thorough understanding of the invention. However, it will be obvious to those skilled in the art that the present invention may be practiced without such specific details. In other instances, well-known circuits, computer equipment, or graphic display systems have been shown in block diagram form in order to not obscure the present invention in unnecessary detail. For the most part, details concerning timing considerations, specific equipment used, specific programming languages used, and the like have been omitted inasmuch as these details are not necessary to obtain a complete understanding of the present invention and are within the skills of persons of ordinary skill in the art.

Figure 1:
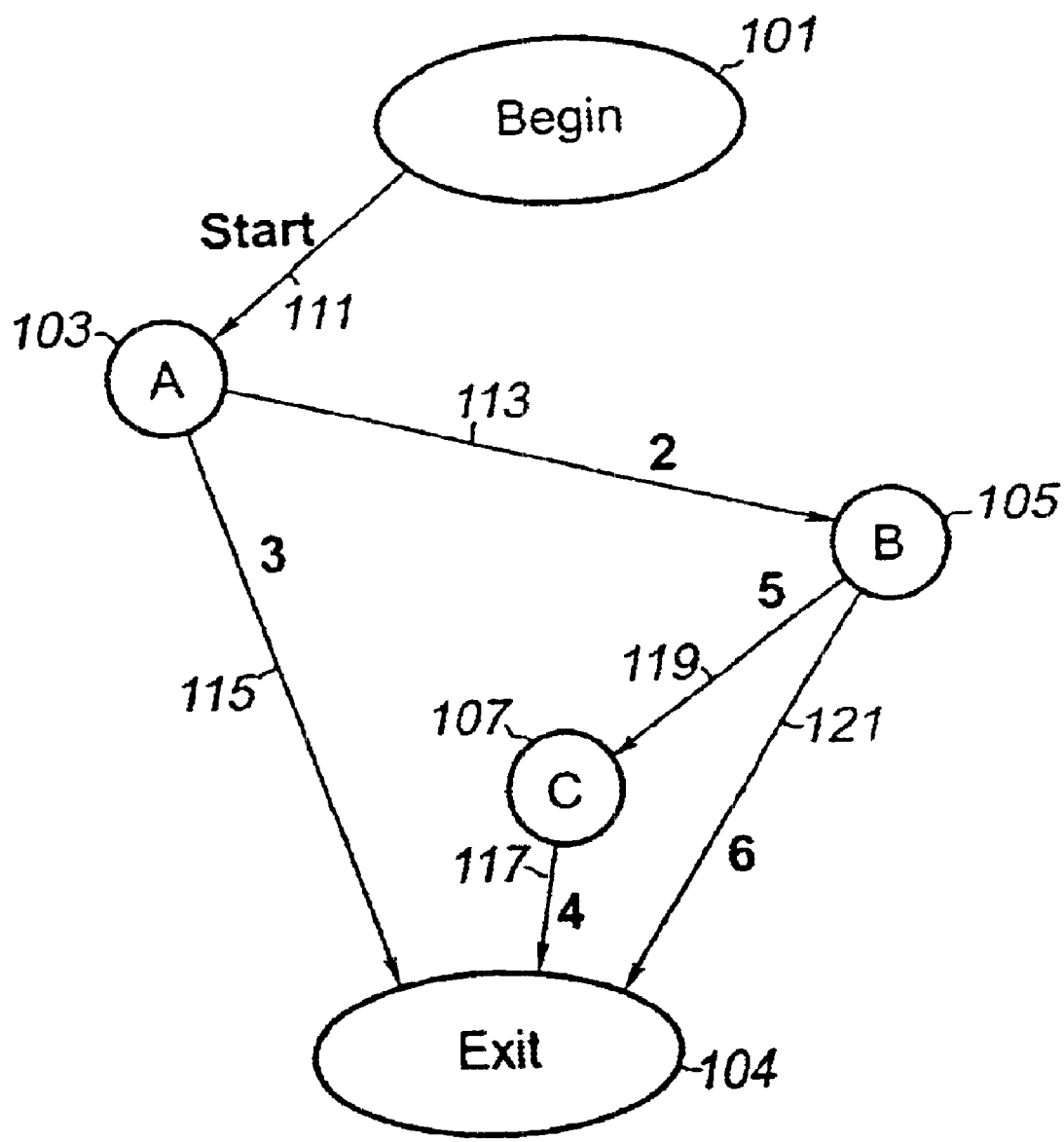
FIG. 1 is a system block diagram representation of a deterministic finite state automation.
Figure 3:
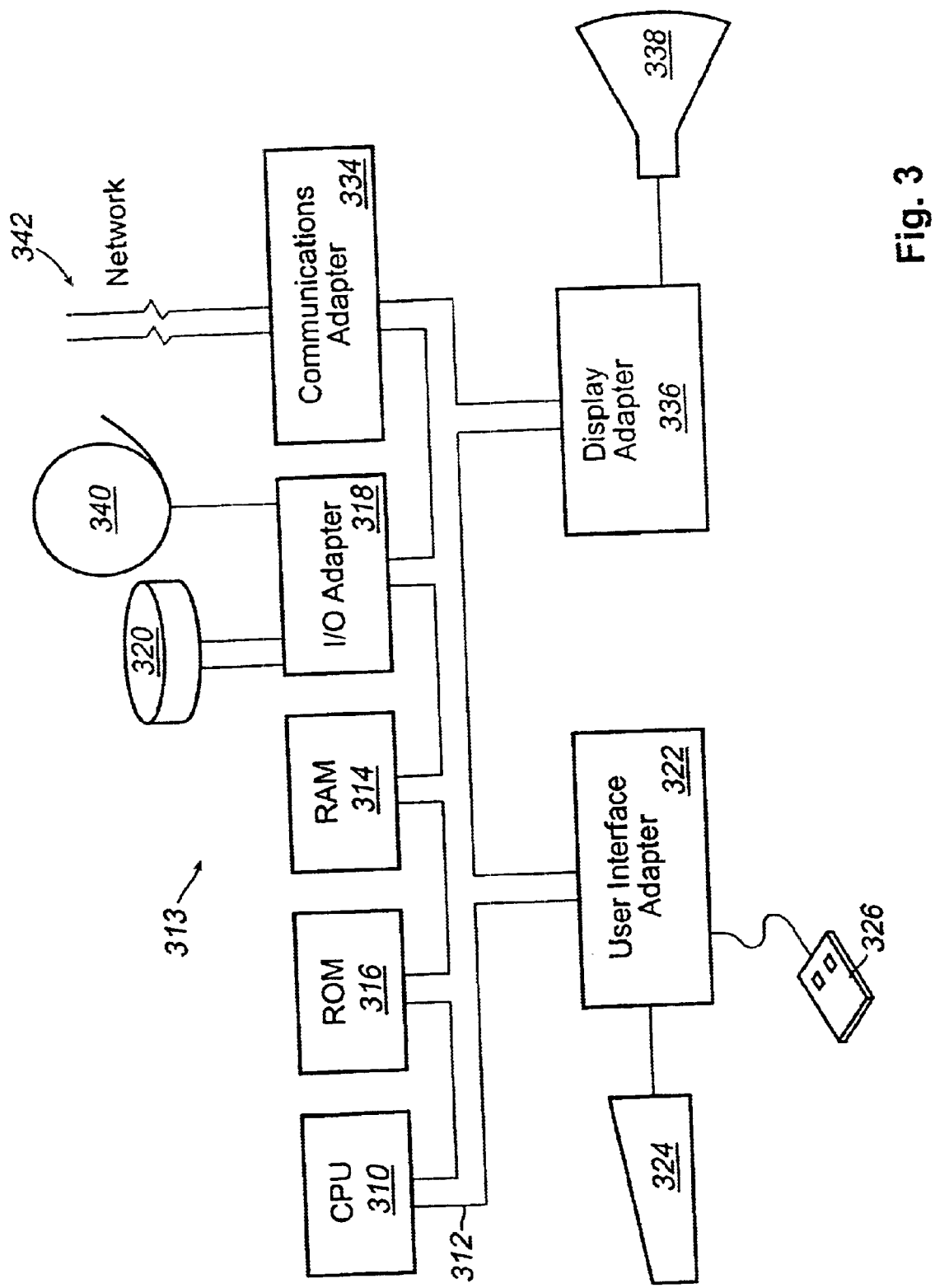
FIG. 3 is a system block diagram of a data processing system hardware and firmware which may be used to implement the invention.

A representative hardware environment for practicing the present invention is depicted in FIG. 3, which illustrates the typical hardware configuration of a data processing system 313 in accordance with the subject invention. The data processing system 313 includes a central processing unit (CPU) 310, such as a conventional microprocessor, and a number of other units interconnected via a system bus 312. The data processing system 313 includes a random access memory (RAM) 314, a read only memory (ROM) 316, and an input/output (I/O) adapter 318 for connecting peripheral devices such as disk units 320 and tape drives 340 to the bus 312, a user interface adapter 322 for connecting a keyboard 324, a mouse 326, and/or other user interface devices such as a touch screen device (not shown) to the bus 312, a communication adaptor 334 for connecting the data processing system 313 to a data processing network 342, and a display adaptor 336 for connecting the bus 312 to a display device 338. The CPU 310 may include other circuitry not shown herein, which will include circuitry found within a microprocessor, e.g., execution unit, bus interface unit, arithmetic logic unit, etc. The CPU 310 may also reside on a single integrated circuit.

The instant invention is a graphically-oriented editor that greatly simplifies the creation, testing, and subsequent revision of activity sequencer engines through the use of activity functional units (AFUs). An AFU is an object that facilitates the meaningful connection of FUs to construct a larger logical entity. Each AFU is representative of a finite state automation or a state nested within a finite state automation. By combining FUs and defining their relationships, the user may simulate iterative processes previously programmed in coded languages.

By way of example, a subroutine that facilitates reading the contents of a data file would be a useful edition to a programming toolkit and could be simulated using an AFU. The act of reading a file requires the performance of several smaller steps that are executed deterministically in a logical manner. Therefore, it can be represented by a deterministic finite state automation, and subsequently an AFU. The following three steps represent a functional decomposition of such an AFU:

Open the file.

Read from the data file.

Close the file.

While at first glance, the reading of data from the file appears to be a simple, straightforward, and easily-implemented activity. Those skilled in the art will note that sequential performance of the steps as outlined does not guarantee successful completion of the desired activity.

Figure 4:
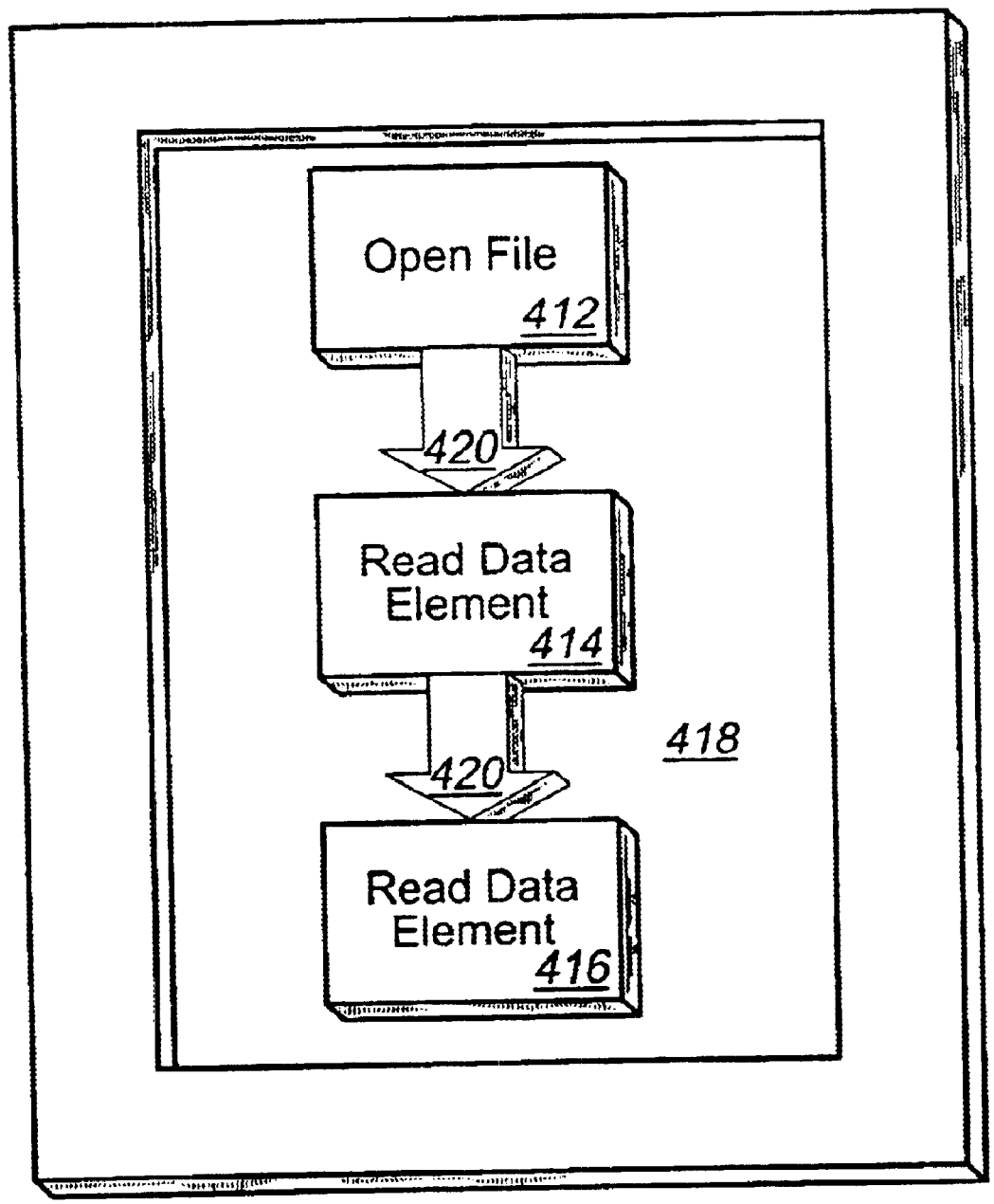
FIG. 4 is a block process diagram to read the contents of a data file.

However, the sequence of these steps may be depicted graphically on a computer screen by the instant invention, as demonstrated with reference to FIG. 4. FIG. 4 depicts a graphical screen 410, which is comprised of the background 418, and several FUs 412, 414, 416. Each FU 412, 414, 416 is depicted on the graphical screen by a geometric shape. While FIG. 4 illustrates these FUs 412, 414, 416 depicted as rectangular boxes, it will be appreciated by those skilled in the art that the FUs could also be depicted by a variety of other geometrical shapes. As FIG. 4 indicates, for the file reading example, an open file FU 412, a read data element FU 414, and a close file FU 416 may be used.

The instant invention provides facility for graphical representation of an iteration or sequence among the FUs 412, 414, 416. Most commonly, such progression from one FU to the next will be depicted by an arrow 420. However, those skilled in the art will appreciate that any geometrical element which indicates a direction of flow from one FU to the next may be used as an alternate embodiment of the invention.

By providing a graphical interface through which to manipulate the FUs, a user may alter the sequence of execution of the program by rearranging the elements on the screen. On FIG. 4, the open file FU 412 executes first, followed by the read data element FU 414, followed by the close file FU 416. By graphically rearranging these FUs on the graphical display 410, users may change the order of execution to perform the read data element FU 414 first, followed by the close file FU 416, followed by the open file FU 412. The user moves the open file FU 412 graphically below the close file FU 416, deletes the arrow 420 between the open file FU 412 and the read data element FU 414, and creates a new arrow from the close file FU 416 to the open file FU 412. Notably, such a change does not require the user to view the contents of any FU 412, 414, 416 or alter any of the complexities that might occur within the FUs 412, 414, 416.

Those skilled in the art will appreciate that, while it would be senseless to make such a modification to the AFU as described (as one must open a file before one can read from the file), this disclosure is directed to the ability to modify iteration of the AFU within the graphical environment without the necessity of viewing the programming of the FUs. Thus, although it may be a programming choice not to make the exact change disclosed herein, the instant invention would allow a user to make such a change or a similar change within the graphical environment with out the necessity of viewing FUs.

Those skilled in the art will appreciate that, while it would be senseless to make such a modification to the AFU described (as one must open a file before one can read from the file), this disclosure is directed to the ability to easily modify the AFU within the graphical environment. Thus, while it may be a programming choice not to make the exact change disclosed herein, the instant invention would allow the user to make such a change or a similar change within the graphical environment.

Those skilled in the art will appreciate that the attempt to open a file may fail. Media may have been removed, a file might have been deleted, or any other of a number of problems might occur. In such a case, sequential execution would force the undesired execution of the next step (reading a data element). In an iterative programming language, provisions for such a condition would lead to complexities. The instant invention provides for a decision making and branching construct in the graphical interface that allows the programs created to evaluate and conditionally execute subsequent actions. Again, this decision-making and branching construct does not require a user to view the contents of the FUs involved. Accordingly, the user is shielded from those complexities and is permitted to program an iterative process in the graphical interface.

Figure 5:
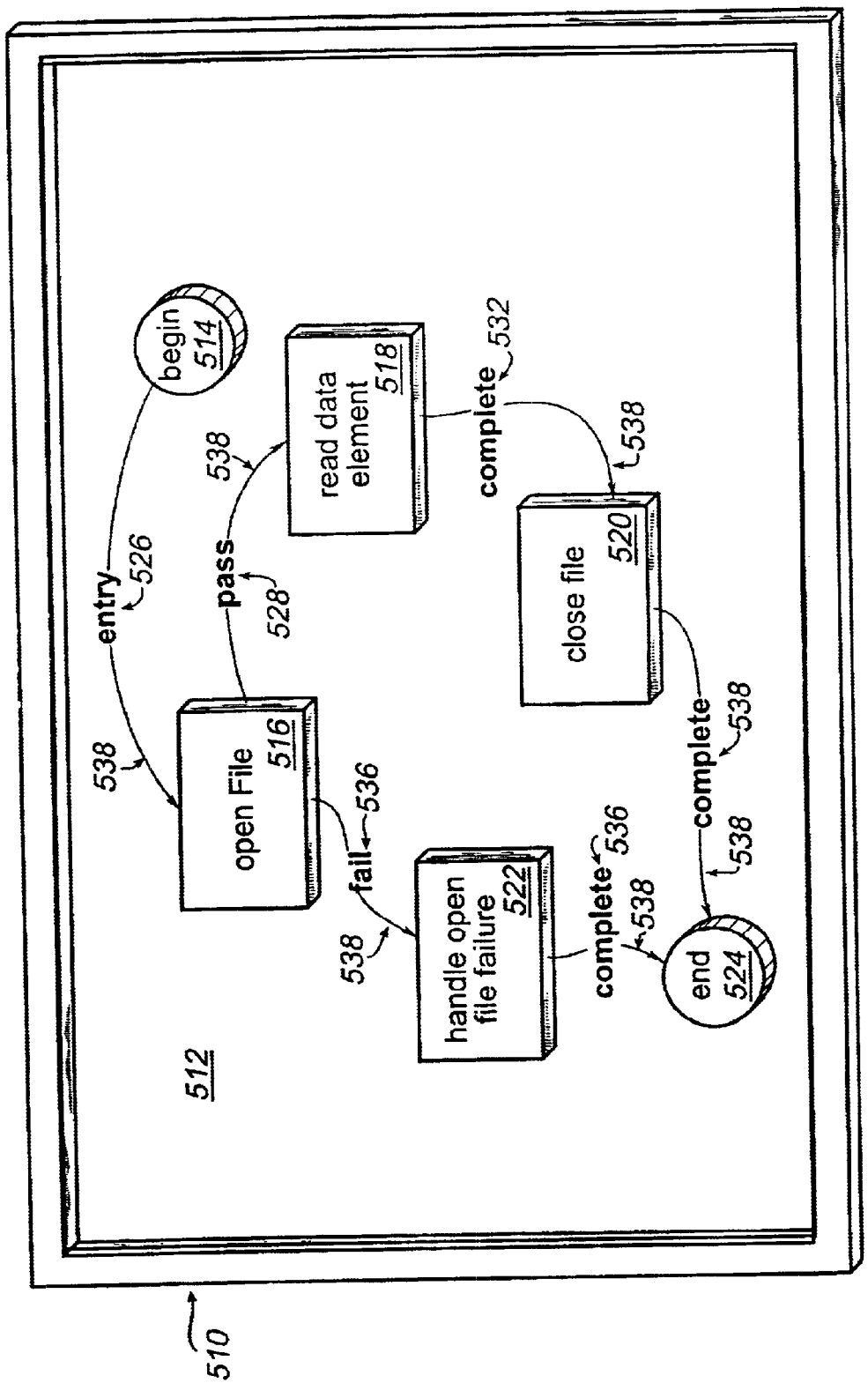
FIG. 5 is a diagram depicting the graphic editor of the instant invention and its ability to define the sequencing and branching of several FUs.

FIG. 5 demonstrates the concepts of multiple exit conditions, branching, and conditional execution within the instant invention. FIG. 5 depicts a graphical screen 510 having a background 512 on which are situated several geometric shapes. A begin point 514 and an end point 524 are represented graphically. Multiple FUs 516, 518, 520, 522 are also be represented graphically. It should be noted that while the begin point 514 and the end point 524 may be represented by the same geometric shape as the FUs 516, 518, 520, 522, it is preferred for clarity that the begin point 514 and the end point 524 be represented on the background 512 of the display screen 510 by a geometric shape different than the geometric shape representing the FUs 516, 518, 520, 522. Such a graphical representation highlights the distinction between the begin point 514, the end point 524 and the other graphical representations upon the screen.

As in FIG. 4, the various FUs 516, 518, 520, 522 in FIG. 5 may be connected by one or more arrows 538 which signify a progression of execution between the FUs 516, 518, 520, 522. However, as is depicted with reference to the open file FU 516, a FU may have more than one arrow 538 coming from it. The instant invention provides for the specifications of conditions 528, 530 in order to determine along which arrow 538 execution should progress. As the example of FIG. 5 illustrates, the open file FU 516 may result in a pass condition 528 or a fail condition 530, which specifications may be provided to the user, as they are not confidential. In the event that the pass condition 528 exists, execution progresses to the read data element FU 518. However, should the fail condition 530 exist, execution progresses to a handle open file failure FU 522. Accordingly, the operation of an activity sequencer engine is mimicked in a user-friendly environment.

Those skilled in the art will appreciate that although exit conditions are specified for each arrow 538, those exit conditions need not be displayed at all times within the instant invention. The user may, at his option, choose to display or hide the exit conditions. When the exit conditions are hidden, they do not appear on the screen 510, but are tracked by the invention, nonetheless.

The begin point 514 presents a special case where the condition is an entry condition 526. Such entry condition 526 may be depicted on the display screen 510 within the arrow 538 originating at the begin point 514. In this way, execution from the begin point 514 to the end point 524 is made clear within the graphical environment.

Those skilled in the art will appreciate that in order to provide full functionality, the instant invention must provide for reiteration within the AFU. For example, in practice, data files typically contain more than one data element. It would be necessary to read the data file element-by-element in a reiterative process. The implementation of this reiteration function within the instant invention is described with reference to FIG. 6.

Figure 6:
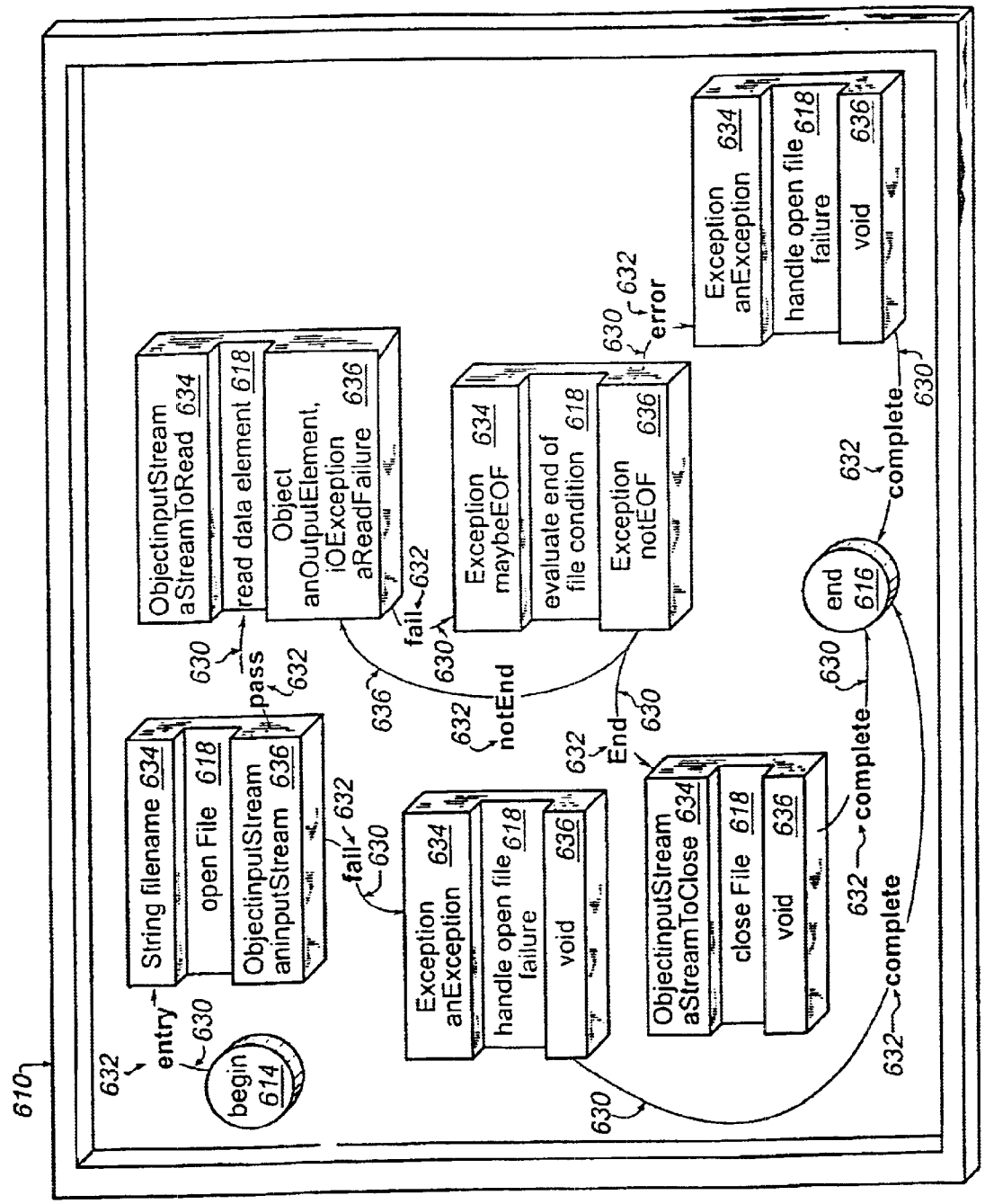
FIG. 6 is a diagram depicting the graphic editor's ability to define data passing between several FUs.

FIG. 6 depicts a graphical screen 610 having a background 612 upon which are situated graphical representations of a begin point 614 and an end point 616. As previously described, the background 612 also positioned on it several graphical representations of FUs 618. Likewise, each FU 618, begin point 614, and end point 616 graphical representation has associated with it one or more arrows 630 beginning at the FU or point and indicating the next FU or point of execution. Each arrow 630 also has associated with it an exit condition 632 which specifies the condition on which execution will pass to the next FU or point.

Reiteration is demonstrated by the arrow 630 between the evaluate end of file condition FU 618 and the read data element FU 618. By referencing a FU earlier in the execution path, the AFU provides for an algorithm that graphically identifies the reiteration of an iterative machine. Such referencing does not require a user to view the underlying FU functionality, so that user-friendliness is enhanced.

The instant invention also provides for the graphical representation of input parameters 634 and output parameters 636. The graphical input parameter representation 634 may be denoted on the screen by any one of a number of geometrical shapes. The geometrical shape for the input parameter 634 is positioned on the screen 610 attached to or on top of the FU 618 with which it is associated. Likewise, the output parameter is represented on the screen by a geometrical shape 636 which is also positioned next to or on top of the FU 618.

Those skilled in the art will appreciate that the input parameter graphic 634 and the output parameter graphic 636 could be placed within or near the FU 618 in a variety of manners, including but not limited to the input parameter 634 being positioned at the top of the FU 618 and the output parameter 636 being positioned at the bottom of the FU 618, as demonstrated in FIG. 6, the input parameter 634 positioned to the left of the output parameter 636, either at the top or the bottom of the FU graphic 618, or any other combination which would suggest to the user the relationship between the input parameter 634, the FU 618, and the output parameter 636. The input and output parameters may be hidden from view and removed from the display screen 610 at the user's option. In an alternative embodiment, the input and output parameters may be permanently hidden from view. However, in such an embodiment, the parameter relationships are still translated by the system and may be viewed manually, as described later herein.

The instant invention also provides for manual entry or viewing of these relationships into a table. The user may toggle between views at the user's discretion. Note that though information about the variable is displayed, potentially confidential information regarding the underlying FU structure is not revealed.

By using the described graphical interface, the user may specify the data that would be passed from one FU to subsequent FUs based upon the exit conditions and conditional executions as appear within the graphical interface without the necessity of viewing specific complexities of subroutines.

The instant invention provides the user the ability to rearrange the graphical representations of FUs on the display screen in order to facilitate interpretation and modification of AFU. This ability is exhibited with reference to FIG. 7A, which illustrates a screen window 710 from a graphical user interface operating system. The window 710 is comprised of an activity composition area 712, a palette area 714, a menu 716, in addition to the normal graphical user interface system tools for window management 718. Within the activity composition area 712, there is a graphical representation of an entry point 720 and a graphical representation of an exit point 722. Also depicted within the activity composition area 712 are several graphical FU representations 724 between the entry point representation 720, the exit point representation 722, and the graphical representations of the AFUs 724 are several arrows 726 which indicate the progression of execution between the entry point 720, the FUs 724, and the exit point 722. The arrows 726 feature exit conditions 728 which represent the conditions under which each respective execution path represented by an arrow 726 should be followed.

Figure 7A:
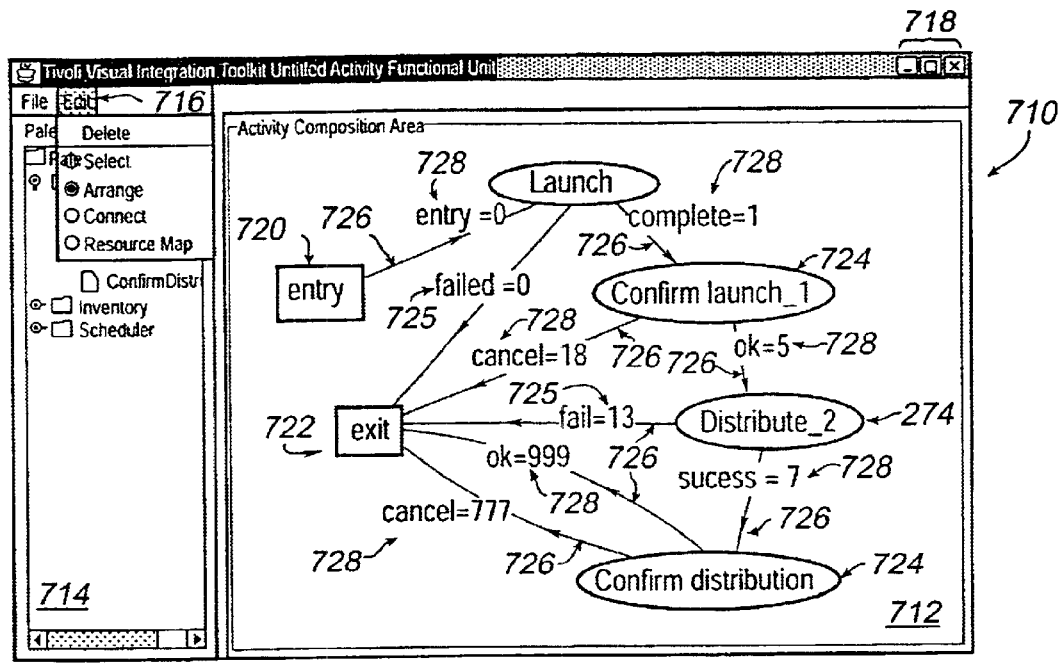
FIG. 7A is a diagram depicting a screen print of the graphic editor and demonstrating its ability to arrange FUs within the graphical environment.

In an implementation of the instant invention, the invention may be placed into "arrange" mode by selecting the appropriate radio button within the menu 716. When in this mode, the user may reposition the FUs 724, the entry point 720, and the exit point 722 within the activity composition area 712. The results of such an arrangement are demonstrated to FIG. 7B, in which the exit point 722 has been moved from the left side of the activity composition area 712 to the right side of the area activity composition area 712. Also, the ConfirmLaunch_1 FU 730 has been relocated, as has the Distribute_2 FU 732 and the ConfirmDistribution_3 FU 734. As each of these changes are made, the invention automatically repositions the arrows 726 and the exit conditions 728 so that the execution path specified in FIG. 7A is identical to the resulting execution path in FIG. 7B. Such functionality permits the user to rearrange the FU's graphical representations in order to facilitate understanding of the operation of the AFU and thus also facilitate changes and additions to the AFU.

Figure 7B:
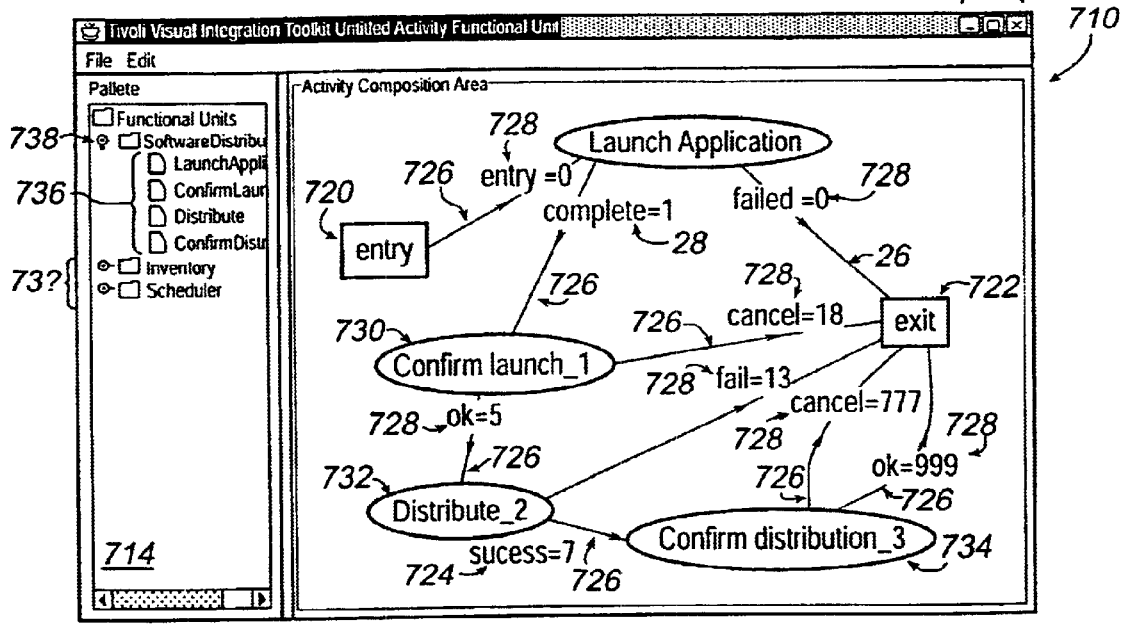
FIG. 7B is a screen print of the graphical editor depicting the result of manipulation of the location of the FUs on the screen.

An implementation of the instant invention may also include a palette 714 as depicted on FIG. 7B. The palette 714 contains a listing of FUs and AFUs 736 which may be dragged from the palette 714 into the activity composition area 712 to add that particular FU or AFU to the AFU being composed on the activity composition area 712 as a FU. The palette 714 may provide for categorization of the FUs and AFUs, as depicted. Categories 738 may be created on the palette 714 so that, upon clicking on any category, the FUs and AFUs within that category appear. For example, FIG. 7B illustrates the "SoftwareDistribution" category opened with its FUs and AFUs 736 displayed.

Figure 8:
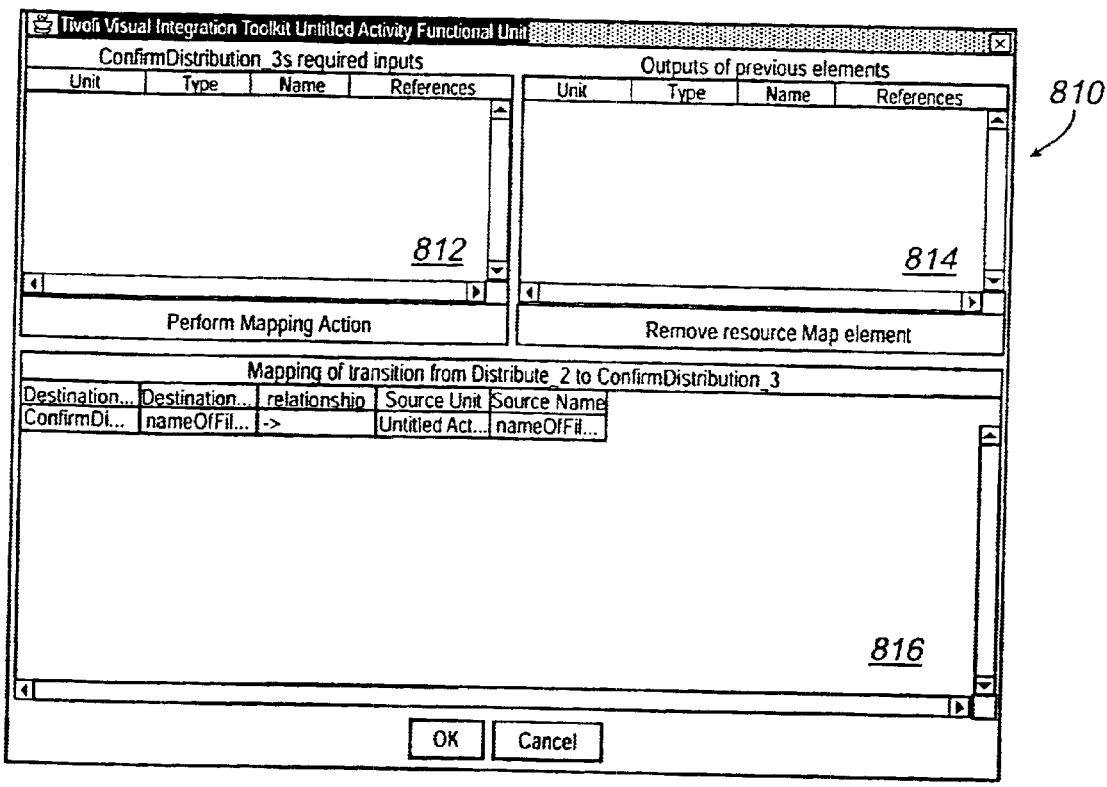
FIG. 8 is a screen print of a functional unit resource mapping dialog box from the graphic editor of the instant invention demonstrating the ability to manually specify parameter passing between FUs.

In an implementation of the instant invention, a user may view parameter passing details of each of the arrows 726 displayed within the activity composition area 712 to allow for interconnection between FUs without revelation of the underlying functionality of the AFUs. For example, details of the parameters relating to the arrow 726 leading to the ConfirmedDistribution_3 FU 734 is shown in FIG. 8. FIG. 8 demonstrates functional unit resource mapping dialog box 810, which is a window from a graphical user interface operating system. The resource mapping dialog box 810 may contain several sections: a required inputs section 812, a previous output section 814, and a parameter transition mapping table 816. The required input box 812 lists information about the input parameters which are required by the destination FU, in this case ConfirmedDistribution_3. The previous outputs box 814 lists the parameters that have been output from previous FUs in the execution iteration depicted in the activity composition area 712 (FIG. 7B). The transition mapping box 816 provides the user with details of the parameter names as those parameters are passed from the names that are used in previous FUs, listed in the previous output box 814, to the target FU's parameters as listed in the input parameter box 812. Such details permit the user to manually enter information and debug the parameter passing without resort to the underlying functions.

Traditional computer code may also be represented by a FU. Using the graphical editor, any FU may be linked to object or interpreted code. While any manner of object or interpreted code can be used, the preferred implementation uses Java code to implement these base-level activities. Those skilled in the art will appreciate that such source code is often highly confidential and proprietary and can also be complex and confusing to the unsophisticated user, making it ideally represented by a FU. The programming features of a FU, such as input and output conditions and parameter passing, coincide precisely with the generally accepted principles of subroutine authoring within traditional programming environments. Accordingly, no translation or transition is required in order to represent a code subroutine as a FU and have that code subroutine used to create an activity sequencer engine.

This capability to represent code as a FU adds an additional feature to the instant invention: existing subroutines may be represented as FUs within the instant invention in order to transform those existing code segments into the graphical format, which is more easily modified and supplemented by the user.

As to the manner of operation and use of the present invention, the same is made apparent from the foregoing discussion. With respect to the above description, it is to be realized that although embodiments of specific material, representations and language are disclosed, those enabling embodiments are illustrative and the optimum relationships for the parts of the invention are to include variations in composition, form, function, and manner of operation, which are deemed readily apparent to one skilled in the art in view of this disclosure. All relevant relationships to those illustrated in the drawings in this specification are intended to be encompassed by the present invention.

Therefore, the foregoing is considered as illustrative of the principles of the invention and since numerous modifications will readily occur to those skilled in the art, it is not desired to limit the invention to the exact construction and operation shown or described, and all suitable modifications and equivalents may be resorted to, falling within the scope of the invention.

What is claimed is:

1. A computer-readable medium having stored thereon a computer program comprising:

an activity functional unit code comprising a set of codes operable to direct a computer to define an activity functional unit (AFU), the AFU comprised of a main set of input parameters, a beginning state, a main set of output parameters, a set of functional units (FUs), and an ending state having associated with it at least one exit condition;

a graphical representation code comprising a set of codes operable to direct the computer to draw a begin geometric shape on a monitor screen at a begin position representative of the beginning state, to draw an end geometric shape on the monitor screen in an end position representative of the ending state, to draw a FU geometric shape on a monitor screen representative for each FU of the set of FU;

a graphical linking code comprising a set of codes operable to direct the computer to accept input from the user to construct an execution path comprising a first leg having a beginning point at the beginning state, an ending point at a member of the set of FU, and a first exit condition, last leg having a beginning point at a member of the set of FU, an ending point at the ending state, and a second exit condition, such that the execution path is continuous between the beginning point and the ending point, and to draw on the monitor screen at least one link geometric shape for each leg between the leg's beginning point and the leg's ending point having a direction representing the execution path from the beginning point to the ending point; and a link manipulation code comprising a set of codes operable to direct the computer to accept input from a user to manipulate at least one geometric link shape to change its source end or its destination end to represent a second execution path which is continuous between the beginning point and the ending point.

2. The computer-readable medium of claim 1 wherein the link geometric shape includes annotations representative of the exit condition.

3. The computer-readable medium of claim 1 wherein the set of FUs is comprised of AFUs.

4. The computer-readable medium of claim 3 further comprising:

parameter linking code comprising a set of codes operable to direct the computer to determine a first set of input parameters for a first FU within the set of FUs, to determine a set of available output parameters comprising the set of output parameters for each FU within the set of FUs to be executed before the first FU and the main set of input parameters, to accept an input from the user, and to link an input parameter within the set of input parameters to an available output within the set of available output parameters according to the input from the user.

5. The computer-readable medium of claim 1 wherein the set of FUs is comprised of programming codes, wherein the programming codes each have a set of input parameters and a set of output parameters.

6. The computer-readable medium of claim 5 further comprising:

parameter linking code comprising a set of codes operable to direct the computer to determine a first set of input parameters for a first programming code within the set of FUs, to determine a set of available output parameters comprising the set of output parameters for each programming code within the set of FUs to be executed before the first programming code and the main set of input parameters, to accept an input from the user, and to link an input parameter within the set of input parameters to an available output within the set of available output parameters according to the input from the user.

7. The computer-readable medium of claim 6 wherein the programming codes are Java code.

8. The computer-readable medium of claim 1 wherein the set of FUs is comprised of a set of AFUs and a set of programming codes, wherein the programming codes each have a set of input parameters and a set of output parameters.

9. The computer-readable medium of claim 8 further comprising:

parameter linking code comprising a set of codes operable to direct the computer to determine a first set of input parameters for a first member within the set of FUs, to determine a set of available output parameters comprising the set of output parameters for each member within the set of FUs to be executed before the first member and the main set of input parameters, to accept an input from the user, and to link an input parameter within the set of input parameters to an available output within the set of available output parameters according to the input from the user.

10. The computer-readable medium of claim 9 wherein the programming codes are Java code.

11. A computer system for programming a computer program comprising:

a computer comprising a central processing unit (CPU), a random access memory (RAM), an input device, and an output device, an activity functional unit code executed by the CPU comprising a set of codes operable to direct the computer system to define an activity functional unit (AFU), the AFU comprised of a main set of input parameters, a beginning state, a main set of output parameters, a set of functional units (FUs) and an ending state having associated with it at least one exit condition;

a graphical representation code executed by the CPU comprising a set of codes operable to direct the computer system to draw on the output device a begin geometric shape at a begin position representative of the beginning state, to draw on the output device an end geometric shape in an end position representative of the ending state, to draw on the output device an AFU geometric shape representative for each execution code of the set of FUs;

a graphical linking code executed by the CPU comprising a set of codes operable to direct the computer system to accept input from the user through the input device, to construct a first execution path comprising a first leg having a beginning point at the beginning state, an ending point at a member of the set of FUs, and a first exit condition, a last leg having a beginning point of a member of the set of FUs, an ending point at the ending state, and a second exist condition, such that the first execution path is continuous between the beginning point and the ending point, and to draw on the output device at least one link geometric shape for each leg between the leg's beginning point and the leg's ending point having a direction representing the first execution path from the beginning point to the ending point; and a link manipulation code executed by the CPU comprising a set of codes operable to direct the computer system to accept input from a user through the input device, to manipulate at least one geometric link shape to change its source end or its destination end to represent a second execution path which is continuous between the beginning point and the ending point.

12. The computer system of claim 11 wherein the link geometric shape includes annotations representative of the exit condition.

13. The computer system of claim 11 wherein the set of FUs is comprised of AFUs.

14. The computer system of claim 13 further comprising:
parameter linking code executed by the CPU comprising a set of codes operable to direct the computer system to determine a first set of input parameters for a first FU within the set of FUs, to determine a set of available output parameters comprising the set of output parameters for each FU within the set of FUs to be executed before the first FU and the main set of input parameters, to accept an input from the user through the input device, and to link an input parameter within the set of input parameters to an available output within the set of available output parameters according to the input from the user.

15. The computer system of claim 11 wherein the set of FUs is comprised of programming codes,
wherein the programming codes each have a set of input parameters and a set of output parameters.

16. The computer system of claim 15 further comprising:
parameter linking code executed by the CPU comprising a set of codes operable to direct the computer system to determine a first set of input parameters for a first programming code within the set of FUs, to determine a set of available output parameters comprising the set of output parameters for each programming code within the set of FUs to be executed before the first programming code and the main set of input parameters, to accept an input from the user through the input device, and to link an input parameter within the set of input parameters to an available output within the set of available output parameters according to the input from the user.

17. The computer system of claim 16 wherein the programming codes are Java code.

18. The computer system of claim 11 wherein the set of FUs is comprised of a set of AFUs and a set of programming codes,
wherein the programming codes each have a set of input parameters and a set of output parameters.

19. The computer system of claim 18 further comprising:
parameter linking code executed by the CPU comprising a set of codes operable to direct the computer system to determine a first set of input parameters for a first member within the set of FUs, to determine a set of available output parameters comprising the set of output parameters for each member within the set of FUs to be executed before the first member and the main set of input parameters, to accept an input from the user though the input device, and to link an input parameter within the set of input parameters to an available output within the set of available output parameters according to the input from the user.

20. The computer system of claim 19 wherein the programming codes are Java code.

21. A method for emulating an activity sequenced engine on a computer system having a monitor screen comprising the steps of:
directing the computer system to define an activity functional unit (AFU), the AFU comprised of a main set of input parameters, a beginning state, a main set of output parameters, a set of functional units (FUs), and an ending state having associated with it at least one exit condition;

directing the computer system to draw a begin geometric shape on the monitor screen at a begin position representative of the beginning state, to draw an end geometric shape on the monitor screen in an end position representative of the ending state, to draw a FU geometric shape on a monitor screen representative for each FU of the set of FUs;

directing the computer system to accept input from the user to construct an execution path comprising a first leg having a beginning point at the beginning state, an ending point at a member of the set of FUs, and a first exit condition, last leg having a beginning point at a member of the set of FUs, an ending point at the ending state, and a second exit condition, such that the execution path is continuous between the beginning point and the ending point, and to draw on the monitor screen at least one link geometric shape for each leg between the leg's beginning point and the leg's ending point having a direction representing the execution path from the beginning point to the ending point; and directing the computer system to accept input from a user to manipulate at least one geometric link shape to change its source end or its destination end to represent a second execution path which is continuous between the beginning point and the ending point.

22. The method of claim 21 wherein the link geometric shape includes annotations representative of the exit condition.

23. The method of claim 21 wherein the set of FUs is comprised of AFUs.

24. The method of claim 23 further comprising the step of:
directing the computer system to determine a first set of input parameters for a first FU within the set of FUs, to determine a set of available output parameters comprising the set of output parameters for each FU within the set of FUs to be executed before the first FU and the main set of input parameters, to accept an input from the user, and to link an input parameter within the set of input parameters to an available output within the set of available output parameters according to the input from the user.

25. The method of claim 21 wherein the set of FUs is comprised of programming codes,
wherein the programming codes each have a set of input parameters and a set of output parameters.

26. The method of claim 25, further comprising the step of:
directing the computer system to determine a first set of input parameters for a first programming code within the set of FUs, to determine a set of available output parameters comprising the set of output parameters for each programming code within the set of FUs to be executed before the first programming code and the main set of input parameters, to accept an input from the user, and to link an input parameter within the set of input parameters to an available output within the set of available output parameters according to the input from the user.

27. The method of claim 26 wherein the programming codes are Java code.

28. The method of claim 21 wherein the set of FUs is comprised of a set of AFUs and a set of programming codes,
wherein the programming codes each have a set of input parameters and a set of output parameters.

29. The method of claim 28 further comprising the step of:
directing the computer system to determine a first set of input parameters for a first member within the set of FUs, to determine a set of available output parameters comprising the set of output parameters for each member within the set of FUs to be executed before the first member and the main set of input parameters, to accept an input from the user, and to link an input parameter within the set of input parameters to an available output within the set of available output parameters according to the input from the user.

30. The method of claim 29 wherein the programming codes are Java code.

* * * * *

UNITED STATES PATENT AND TRADEMARK OFFICE
CERTIFICATE OF CORRECTION

PATENT NO.   : 6,654,033 B1
DATED        : November 25, 2003
INVENTOR(S)  : Mark Lee Miller and Michael Scott Priddy It is certified that error appears in the above-identified patent and that said Letters Patent is hereby corrected as shown below:

Column 12,
Line 46, following "25" please delete ",".

Signed and Sealed this

Fifteenth Day of June, 2004

JON W. DUDAS
*Acting Director of the United States Patent and Trademark Office*